United States Patent
Wang

(10) Patent No.: US 10,367,366 B2
(45) Date of Patent: Jul. 30, 2019

(54) WIRELESS CHARGING DEVICE

(71) Applicant: Lenovo (Beijing) Limited, Beijing (CN)

(72) Inventor: Tingting Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 35 days.

(21) Appl. No.: 15/082,244

(22) Filed: Mar. 28, 2016

(65) Prior Publication Data

US 2017/0155270 A1  Jun. 1, 2017

(30) Foreign Application Priority Data

Nov. 30, 2015  (CN) .......................... 2015 1 0892040

(51) Int. Cl.
| | |
|---|---|
| *H02J 7/00* | (2006.01) |
| *H02J 7/02* | (2016.01) |
| *H04B 5/00* | (2006.01) |
| *H02J 50/10* | (2016.01) |
| *H02J 50/70* | (2016.01) |
| *H02J 50/90* | (2016.01) |

(52) U.S. Cl.
CPC ............. *H02J 7/025* (2013.01); *H02J 50/10* (2016.02); *H02J 50/70* (2016.02); *H02J 50/90* (2016.02); *H04B 5/0037* (2013.01); *H02J 7/00* (2013.01); *H02J 7/0013* (2013.01); *H02J 7/0042* (2013.01)

(58) Field of Classification Search
CPC .. H02J 7/025; H02J 5/005; H02J 17/00; H02J 7/0042; H02J 7/0013; H02J 7/0052; H02J 50/10; H02J 7/00; H02J 50/90; H02J 50/70; H02J 50/80; H02J 7/042; H02J 50/40; H02J 5/00; H02J 7/045; H04B 5/0037

See application file for complete search history.

(56) References Cited

U.S. PATENT DOCUMENTS

| | | | | |
|---|---|---|---|---|
| 9,318,922 B2* | 4/2016 | Hall | .......................... | B60L 1/00 |
| 9,672,976 B2* | 6/2017 | Levo | ..................... | H01F 27/365 |
| 9,837,846 B2* | 12/2017 | Partovi | ................... | H02J 7/025 |
| 9,923,406 B2* | 3/2018 | Percebon | ................ | H02J 7/042 |
| 2012/0146576 A1* | 6/2012 | Partovi | ................. | H01F 7/0252 320/108 |
| 2012/0306284 A1* | 12/2012 | Lee | .......................... | H02J 17/00 307/104 |
| 2013/0285605 A1* | 10/2013 | Partovi | ................. | H02J 7/0042 320/108 |
| 2014/0009109 A1* | 1/2014 | Lee | .......................... | H02J 17/00 320/108 |

(Continued)

FOREIGN PATENT DOCUMENTS

| | | |
|---|---|---|
| CN | 104253452 A | 12/2014 |
| CN | 104578449 A | 4/2015 |

*Primary Examiner* — Helen Rossoshek
(74) *Attorney, Agent, or Firm* — Kunzler Bean & Adamson

(57) ABSTRACT

The present disclosure describes embodiments of a wireless charging device including a first charging unit that charges a first electronic device according to a first wireless charging protocol, a second charging unit that charges a second electronic device according to a second wireless charging protocol. The wireless charging device further includes a shield arranged between the first and second charging units, wherein the shield absorbs a magnetic field generated by at least one of the first charging unit and the second charging unit.

20 Claims, 4 Drawing Sheets

(56) References Cited

U.S. PATENT DOCUMENTS

| | | | | |
|---|---|---|---|---|
| 2014/0217966 A1* | 8/2014 | Schneider | ............. | B60L 11/182 320/108 |
| 2014/0361741 A1* | 12/2014 | Von Novak, III | ...... | H02J 7/025 320/108 |
| 2015/0240531 A1* | 8/2015 | Blust | .................. | G07C 9/00571 340/5.5 |
| 2015/0357860 A1* | 12/2015 | Wippler | .................. | H02J 7/025 320/108 |
| 2015/0380972 A1* | 12/2015 | Fort | ........................ | H02J 7/025 320/108 |
| 2016/0087485 A1* | 3/2016 | Maeda | .................... | H02J 7/025 455/573 |
| 2016/0173160 A1* | 6/2016 | Gronewoller | ........ | H04B 1/3888 455/575.8 |
| 2016/0218545 A1* | 7/2016 | Schroeder | ................ | H02J 7/025 |
| 2016/0221441 A1* | 8/2016 | Hall | ........................ | B60L 1/00 |
| 2016/0301237 A1* | 10/2016 | Chen | ........................ | H01F 38/14 |
| 2017/0018949 A1* | 1/2017 | Pudipeddi | ............... | H02J 50/10 |
| 2017/0063098 A1* | 3/2017 | Jeong | ..................... | H02J 50/12 |
| 2017/0085297 A1* | 3/2017 | Gao | ........................ | H02J 50/20 |
| 2017/0110911 A1* | 4/2017 | Bossetti | .................. | H02J 50/10 |
| 2017/0231345 A1* | 8/2017 | Gronewoller | .......... | A45C 11/00 455/575.8 |
| 2017/0237296 A1* | 8/2017 | Keith | ..................... | H02J 50/12 307/104 |
| 2018/0048189 A1* | 2/2018 | Park | ........................ | H02J 50/12 |

\* cited by examiner

WIRELESS CHARGING DEVICE

CROSS-REFERENCE TO RELATED APPLICATIONS

This patent application claims priority to People's Republic of China Patent Application No. 201510892040.6 filed on Nov. 30, 2015 for TINGTING WANG, the entire contents of which are incorporated herein by reference for all purposes.

FIELD

The subject matter disclosed herein relates to a wireless charging device, in particular to a wireless charging device charging through electromagnetic induction.

BACKGROUND

A wireless charging device can perform wireless charging of external electronic devices through electromagnetic induction. Specifically, the wireless charging device generates a magnetic field through an output coil while the external electronic device induces a magnetic field through a receiving coil, so as to generate a charging current, thereby achieving wireless charging.

In wireless charging technology, there are various wireless charging protocols (for example, Qi protocol, A4WP protocol, and the like). Wireless charging devices only support a specific wireless charging protocol, and thus, can only charge external electronic devices supporting said specific wireless charging protocol. Therefore, a wireless charging device that only supports a specific wireless charging protocol is unable to charge an external electronic device supporting other wireless charging protocols.

When a user has multiple electronic devices that each supports different wireless charging protocols, a user needs to prepare different wireless charging devices that are specific to different wireless charging protocols, thereby adversely affecting user experience and portability.

SUMMARY

Embodiments disclosed herein provide a wireless charging device that is compatible with two different wireless charging protocols, and is able to charge any external electronic device supporting either of the two wireless charging protocols.

A wireless charging device for wireless charging of external electronic devices is disclosed. The wireless charging device includes a first charging unit that charges a first electronic device according to a first wireless charging protocol, a second charging unit that charges a second electronic device according to a second wireless charging protocol. The wireless charging device further includes a shield arranged between the first and second charging units, wherein the shield absorbs a magnetic field generated by at least one of the first charging unit and the second charging unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Exemplary embodiments of the disclosure will be explained in more detail in the following text with reference to the attached drawings. The following description with reference to the attached drawings is provided to assist in an understanding of exemplary embodiments of the wireless charging device as defined by the Claims and their equivalents. The description comprises various kinds of specific details to facilitate understanding, but are only regarded as schematic. Accordingly, those of ordinary skill in the art will recognize that various changes and modifications of the embodiments described herein can be made without departing from the scope and spirit of the disclosed embodiments. In addition, descriptions of well-known functions and constructions may be omitted for clarity and conciseness.

Figure 1:
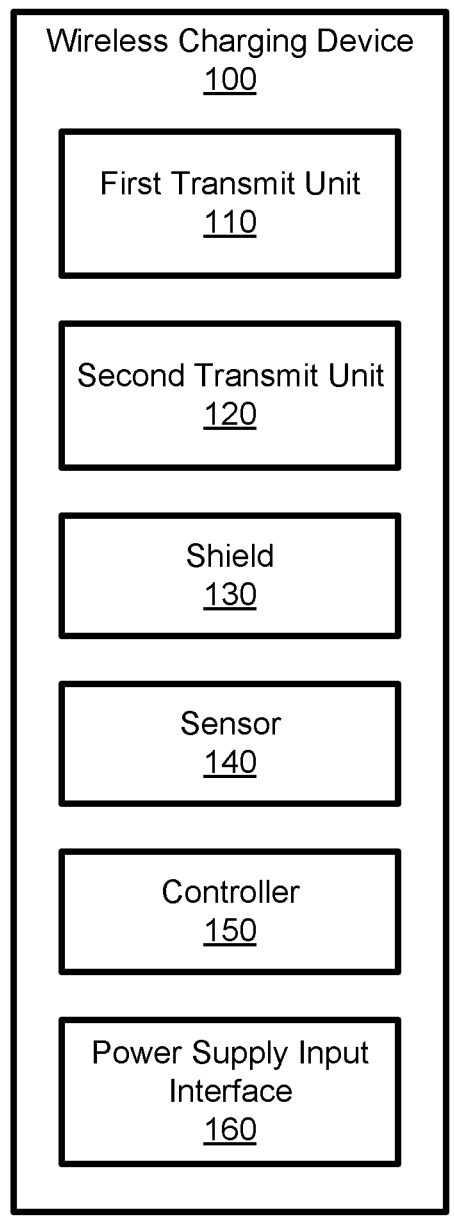
FIG. 1 shows a schematic block diagram of a wireless charging device in one embodiment of the disclosure.

The wireless charging device in embodiments of the disclosure will be explained in more detail with reference to FIG. 1. FIG. 1 shows a functional block diagram of the wireless charging device. The wireless charging device 100 as shown in FIG. 1 performs wireless charging of external electronic devices, such as mobile phones, tablet PCs, digital cameras, and the like.

As shown in FIG. 1, the wireless charging device 100 comprises a first charging unit (including a first transmit unit 110), a second charging unit (including a second transmit unit 120), and a shield 130.

The first transmit unit 110 comprises a first output coil, and the first transmit unit 110 is configured to generate a magnetic field through the first output coil according to a first charging protocol.

Specifically, the first transmit unit generates a magnetic field through the first output coil according to a first wireless charging protocol, such as the A4WP (Alliance for Wireless Power) protocol. For example, according to the A4WP protocol, the first transmit unit 110 generates a magnetic field with a preset resonant frequency through the first output coil. An external electronic device induces the magnetic field with the preset resonant frequency through a receiving coil, thereby generating a charging current. The A4WP protocol has a large charging range (that is, the distance between the first output coil and the receiving coil can be large), and is capable of simultaneously charging a plurality of electronic devices. In addition, in the A4WP protocol, in order to ensure that the receiving coil effectively induces the magnetic field generated by the output coil, the distance between the first output coil and the receiving coil is not to be too close and may be larger than a preset value.

Specifically, the distance between the first output coil and the receiving coil may be larger than the preset value of, for example, 9 mm.

Figure 2:
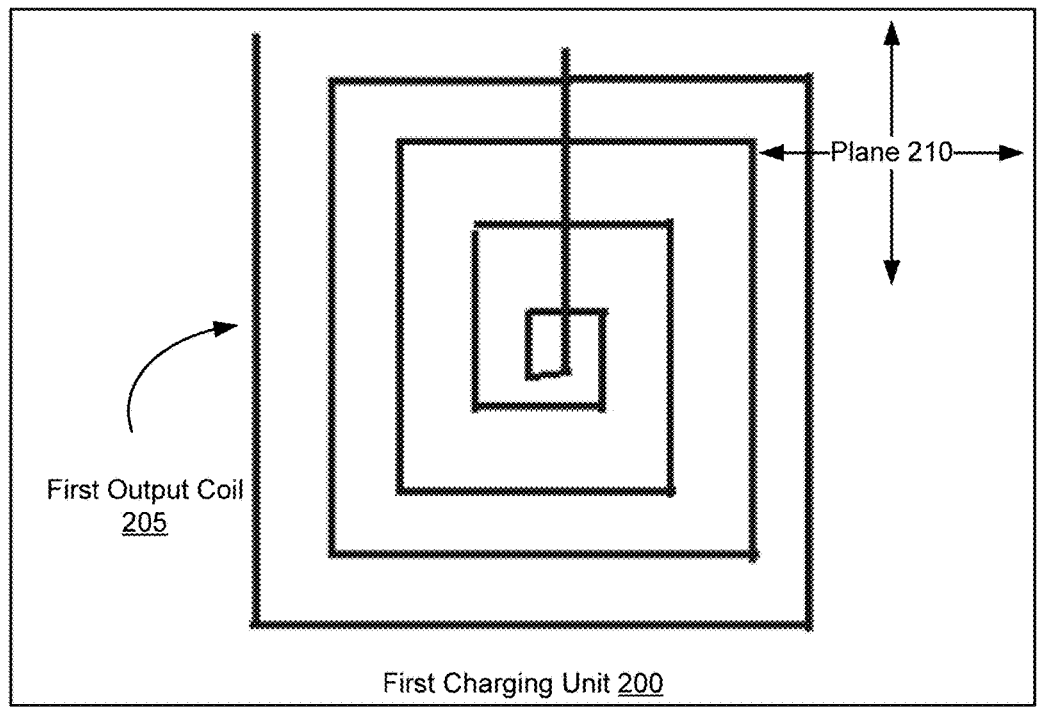
FIG. 2 is a top view of one embodiment of a first charging unit of the wireless charging device of FIG. 1.

FIG. 2 illustrates one embodiment of a first charging unit 200 comprising a first output coil 205. The first output coil 205 illustrated in the FIG. 2 may generate a magnetic field in accordance with the A4WP protocol. FIG. 2 shows a top view of the first output coil 205. In addition, in FIG. 2, the first output coil 205 may be winded along a direction perpendicular to the plane 210 as shown in FIG. 2. On the plane 210 as shown in FIG. 2, the first output coil 205 is large in size, so as to ensure a large charging range, and may charge multiple electronic devices simultaneously. In addition, the first wireless charging protocol is not limited to the A4WP protocol, and could be another wireless charging protocol.

The second transmit unit 120 comprises a second output coil, the second transmit unit 120 is configured to generate a magnetic field through the second output coil according to a second charging protocol.

Specifically, the second transmit unit 120 generates a magnetic field through the second output coil according to wireless charging protocol, such as the Qi protocol. For example, according to the Qi protocol, the second transmit unit 120 generates a magnetic field with a high frequency through the second output coil. An external electronic device induces the magnetic field with high frequency through the receiving coil, thereby generating a charging current. Due to the high frequency magnetic field generated in the Qi protocol, the charging efficiency may be effectively improved. However, the charging distance of the Qi protocol is narrower than that of the A4WP protocol, and it may only able to charge a single electronic device.

Figure 3:
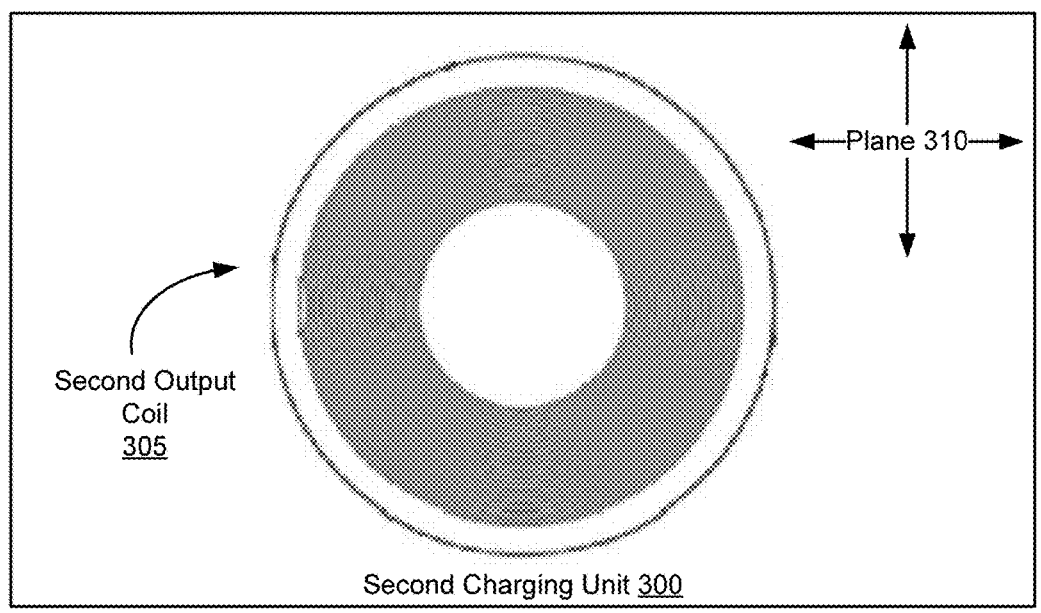
FIG. 3 is a top view of one embodiment of a second charging unit of the wireless charging device of FIG. 1.

FIG. 3 illustrates one embodiment of a second charging unit 300 comprising a second output coil 305. The second output coil 305 illustrated in FIG. 3 may generate a magnetic field in accordance with the Qi protocol. FIG. 3 shows a top view of the second output coil 305. In addition, in FIG. 3, the second output coil 305 is winded along a direction perpendicular to the plane 310 as shown in FIG. 3. On the plane 310 as shown in FIG. 3, the second output coil 305 may be small in size, thus the charging range is narrower, and it only charges a single electronic device at a time. In addition, the second charging protocol is not limited to the Qi protocol, and could be another wireless charging protocol, so long as it differs from the first charging protocol.

A shield 130 is arranged between the first output coil 205 and the second output coil 305 and is configured to form a closed loop of a magnetic field generated by the first output coil 205 or a magnetic field generated by the second output coil 305.

Without the shield 130, when the first output coil 205 generates a magnetic field, the second output coil 305 may absorb the magnetic field, or when the second coil 305 generates a magnetic field, the first output coil 205 may absorb the magnetic field. Therefore, the magnetic field generated by the output coils 205 and 305 may not be effectively transmitted to the receiving coils, leading to reduced charging efficiency.

As mentioned above, the shield 130 may form a closed loop of the magnetic field generated by the first output coil 205 or the magnetic field generated by the second output coil 305, so as to avoid the first output coil 205 or the second output coil 305 absorbing the magnetic field generated by each other. In one embodiment, the shield 130 is composed of a ferrite material.

The wireless charging device 100 according to the disclosed embodiments is compatible with two different wireless charging protocols by using two transmit units; that is, the first transmit unit 110 and the second transmit unit 120 can charge any external electronic device supporting either of the two wireless charging protocols, which extends its scope of application. Furthermore, only one wireless charging device 100 is required for external electronic devices that support different wireless charging protocols, improving user experience and portability.

Figure 4:
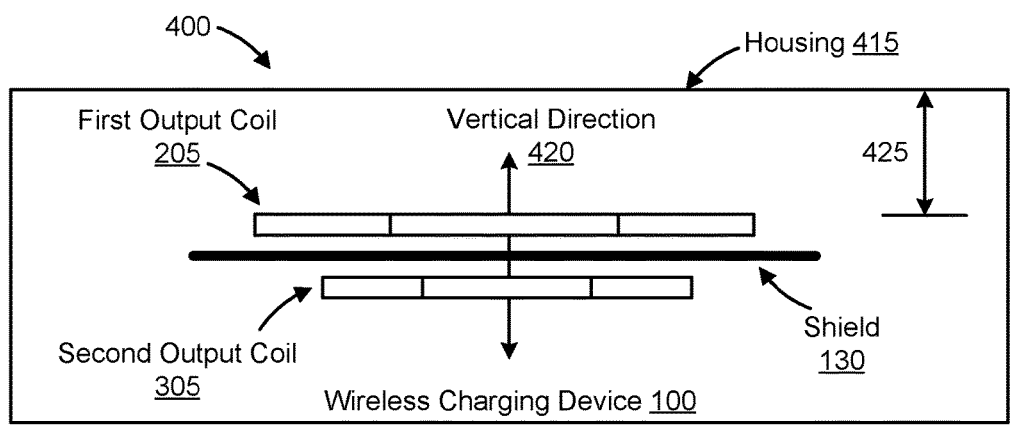
FIG. 4 is a side view of the wireless charging device of FIG. 1 illustrating a relative arrangement of the first and second charging units.

Hereinafter, the structural relationship 400 of the first output coil 205, the second output coil 305, and the shield 130 are illustrated with reference to a side view structure diagram of the wireless charging device 100 in exemplary embodiments of the disclosure as shown in FIG. 4.

In exemplary embodiments, the first output coil 205 and the second output coil 305 wind around in the same axial direction.

As shown in FIG. 4, the vertical direction 420 is the axial direction perpendicular to the plane 210 of the first output coil 205 as shown in FIG. 2 and the plane 310 of the second output coil 305 as shown in FIG. 3. As illustrated in FIG. 4, the axial direction of the first output coil 205 is the same as the axial direction of the second output coil 305.

Along the vertical direction 420 in FIG. 4 (that is, the axial direction of the first output coil 205 and the second output coil 305), the first output coil 205, the shield 130, and the second output coil 305 are arranged in an overlapping manner. Specifically, the first output coil 205, the shield 130, and the second output coil 305 may be arranged in overlapping manner along the vertical direction 420. In addition, according to the placement direction of the wireless charging device 100, it may also be expressed that the second output coil 305, the shield 130, and the first output coil 205 are arranged in overlapping manner along the vertical direction 420.

In addition, the size of the shield 130 may be larger than the size of the first output coil 205 and the second output coil 305 on the plane perpendicular to the axial direction (vertical direction 420 in FIG. 4). Therefore, the horizontal length of the shield 130 may be longer than the horizontal length of the first output coil 205 and the second output coil 305 in FIG. 4. In addition, although not shown in FIG. 4, the length in the depth direction of the shield 130 may be longer than the length in the depth direction of the first output coil 205 and the second output coil 305.

As mentioned above, the size of the shield 130 located between the first output coil 205 and the second output coil 305 may be larger than the size of the first output coil 205 and the second output coil 305 on the plane perpendicular to axial direction (vertical direction 420 in FIG. 4), thus the shield 130 may form a closed loop of the magnetic field generated by the first output coil 205 or the magnetic field generated by the second output coil 305, so as to avoid the first output coil 205 and the second output coil 305 absorbing the magnetic field generated by each other.

In addition, as mentioned above, in the A4WP protocol, in order to ensure that the receiving coil can effectively induce the magnetic field generated by the output coil, the distance between the first output coil 205 and the receiving coil is not to be too close and may be larger than a specified value. Therefore, in the disclosed embodiments, in order to ensure that the distance between the first output coil and the receiving coil is greater than a preset value, the distance between the first output coil 205 and a housing 415 of the wireless charging device 100 may be greater than a specified value along the axial direction as shown in FIG. 4. As mentioned above, the distance between the first output coil 205 and the receiving coil may be greater than a preset value, such as 9 mm; in exemplary embodiments, the distance between the first output coil 205 and housing 415 of the wireless charging device 100 may be greater than an appropriate specified value (for example, 8.9 mm), so as to ensure the distance between the first output coil 205 and the receiving coil is greater than the above preset value when the first output coil 205 generates a magnetic field.

The wireless charging device 100 may further comprise a power supply input interface. The power supply input interface is used to supply power to the first transmit unit 110 and the second transmit unit 120. The power supply supplying power to the first transmit unit 110 and the second transmit unit 120 may be arranged outside the wireless charging device 100 or inside the wireless charging device 100.

Specifically, some embodiments of the present disclosure supply power to the first transmit unit 110 and the second transmit unit 120 through the same power supply input interface. Specifically, the power supply input interface may be connected to the first transmit unit 110 and the second transmit unit 120, and configured to supply power to the first transmit unit 110 and the second transmit unit 120. In other embodiments, different power supply input interfaces for, respectively, the first transmit unit 110 and the second transmit unit 120 may be provided, so as to supply power to the first transmit unit 110 and the second transmit unit 120 through separate power supply input interfaces.

In certain embodiments, the wireless charging device 100 further comprises a sensor 140 and a controller 150.

Specifically, the sensor 140 may be configured to detect a position of the wireless charging device 100 to generate detection information. For example, the detection information generated by the sensor 140 indicates whether the first output coil 205 is above the second output coil 305 or whether the second output coil 305 is above the first output coil 205. Specifically, the sensor 140 may be an accelerometer, an acceleration transducer, or the like, and thereby generates acceleration information corresponding to the status of the wireless charging device 100. According to the orientation of the sensor, for example, when acceleration along a specific direction (for example, the gravity acceleration direction) is positive, the acceleration information indicates that the first output coil 205 is above the second output coil 305; when acceleration along a specific direction (for example, the gravity acceleration direction) is negative, the acceleration information indicates that the second output coil 305 is above the first output coil 205.

In addition, a controller 150 may be configured to control the first transmit unit 110 or the second transmit unit 120 to generate a magnetic field based on the detection information generated by the sensor.

For example, as mentioned above, the detection information generated by the sensor 140 indicates whether the first output coil 205 is above the second output coil 305 or the second output coil 305 is above the first output coil 205. When the detection information generated by the sensor 140 indicates that the first output coil 205 is above the second output coil 305, the controller 150 controls the power supply input interface 160 to supply power to the first transmit unit 110; when the detection information generated by the sensor 140 indicates that the second output coil 305 is above the first output coil 205, the controller 150 controls the power supply input interface 160 to supply power to the second transmit unit 120. As mentioned above, the controller 150 controls the power supply input interface 160 to supply power to the first transmit unit 110 or the second transmit unit 120, so as to control the first transmit unit 110 or the second transmit unit 120 to generate a magnetic field.

For example, when the controller 150 controls the power supply input interface 160 to supply power to the first transmit unit 110 or the second transmit unit 120, if power is supplied to the first transmit unit 110 and the second transmit unit 120 through the same power supply input interface, the controller 150 will then control the same power supply input interface 160 to supply power to the first transmit unit 110 or the second transmit unit 120. Otherwise, when different power supply input interfaces are provided for the first transmit unit 110 and the second transmit unit 120, respectively, and power is supplied to the first transmit unit 110 and the second transmit unit 120 through the respective power supply input interfaces, the controller 150 will enable the corresponding power supply input interface 160 to supply power to the corresponding transmit unit according to a status of the wireless charging device 100 indicated by the detection information (for example, whether the first output coil 205 is above the second output coil 305 or whether the second output coil 305 is above the first output coil 205), and disables other power supply input interfaces to prohibit power supply to the other of the transmit units 110 and 120.

In this way, the controller 150 controls the first transmit unit 110 or the second transmit unit 120 to generate a magnetic field through controlling the power supply of the first transmit unit 110 and the second transmit unit 120. However, in other embodiments, power may be constantly supplied to the first transmit unit 110 and the second transmit unit 120 as the controller 150 controls the first transmit unit 110 or the second transmit unit 120 to generate a magnetic field according to the detection information generated by the sensor. For example, the controller 150 may control the first transmit unit 110 or the second transmit unit 120 to generate a magnetic field according to the status of the wireless charging device 100 indicated by the detection information (for example, whether the first output coil 205 is above the second output coil 305 or whether the second output coil 305 is above the first output coil 205).

In embodiments of the disclosure, the controller 150 can be realized by electronic hardware, computer software, or a combination thereof. Software modules of the computer software may be stored in any form of storage media.

As mentioned above, the magnetic field may be generated by the transmit unit comprising the upper output coil. For example, when the first output coil 205 is above the second output coil 305, the magnetic field may be generated by the first transmit unit 110; when the second output coil 305 is above the first output coil 205, the magnetic field is generated by the second transmit unit 120.

Figure 5:
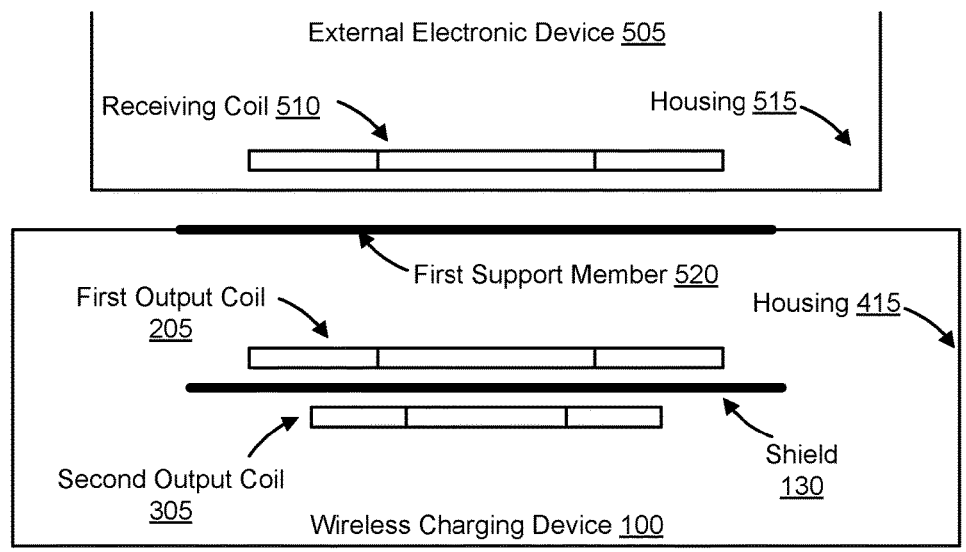
FIG. 5 illustrates the wireless charging device of FIG. 1 performing wireless charging via a first wireless charging protocol.

FIG. 5 illustrates the wireless charging device 100 when performing wireless according to embodiments of the present disclosure. In order to charge an external electronic device 505 that supports a first charging protocol, users place the wireless charging device 100 in a position where the first output coil 205 is above the second output coil 305, as shown in FIG. 5.

Because the first output coil 205 is above the second output coil 305, the controller 150 controls the first transmit unit 110 to generate a magnetic field. As the first transmit unit 110 generates a magnetic field according to the first charging protocol, the receiving coil 510 of the external electronic device 505 supporting the first charging protocol induces the magnetic field generated according to the first charging protocol, thereby achieving wireless charging.

For example, when the first charging protocol is the A4WP protocol, if a user wants to charge the external electronic device 505 supporting the A4WP protocol by the wireless charging device 100, the user places the wireless charging device 100 in a position where the first output coil 205 is above the second output coil 305 and places the external electronic device 505 on a first support member 520 of the housing 415 of the wireless charging device 100. Thereby, the wireless charging device 100 may charge the external electronic device 505 supporting the A4WP protocol.

Figure 6:
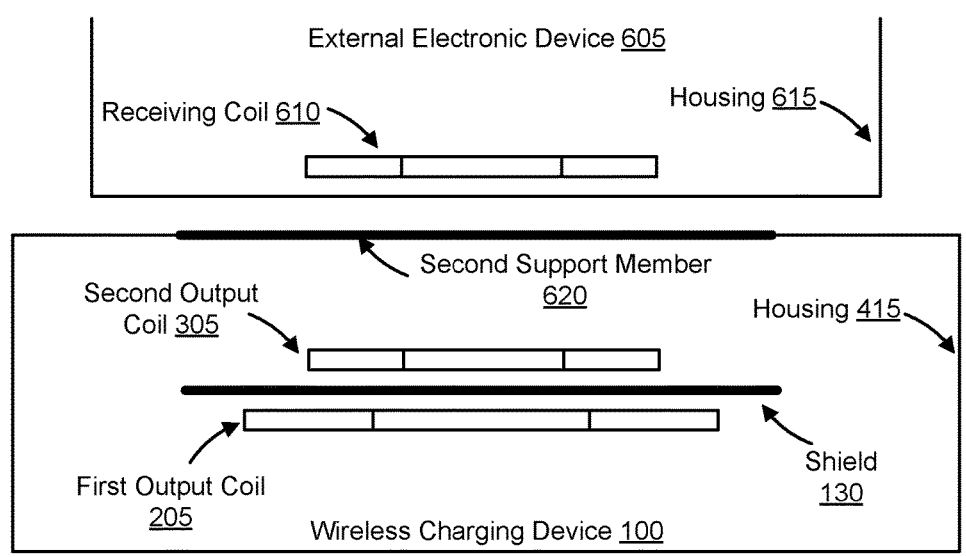
FIG. 6 illustrates the wireless charging device of FIG. 1 performing wireless charging via a second wireless charging protocol.

FIG. 6 illustrates the second state of the wireless charging device 100 when performing wireless charging according to embodiments of the disclosure. In addition, in order to charge an external electronic device 605 that supports the second charging protocol, users may place the wireless charging device 100 in a position where the second output coil 305 is above the first output coil 205, as shown in FIG. 6.

As shown in FIG. 6, since the second output coil 305 is above the first output coil 205, the controller 150 controls the second transmit unit 120 to generate a magnetic field. As the second transmit unit 120 generates a magnetic field according to the second charging protocol, the receiving coil 610 of the external electronic device 605 that supports the second charging protocol induces the magnetic field generated according to the second charging protocol, thereby achieving wireless charging.

For example, when the second charging protocol is the Qi protocol, if a user wants to charge an external electronic device supporting the Qi protocol by the wireless charging device 100, the user places the wireless charging device 100 in a position where the second output coil 305 is above the first output coil 205 and places the external electronic device 605 on a second support member 620 of the housing 415 of the wireless charging device 100. Thereby, the wireless charging device 100 may charge the external electronic device 605 supporting the Qi protocol.

In conclusion, the wireless charging device 100 of the embodiments of the disclosure is able to charge both external electronic devices that support the first charging protocol (e.g., the external electronic device 505) and external electronic devices that support the second charging protocol (e.g., the external electronic device 605), extending the range of applications compared with wireless charging devices which only support one charging protocol. Furthermore, only one wireless charging device 100 is required for external electronic devices that support different wireless charging protocols, improving user experience and portability.

Those skilled in the art should understand that many modifications, combinations or sub-combinations can be made without departing from the principle and scope of the disclosure, and such modifications should be considered as falling under the scope of the disclosure.

It is to be noted that, in the description, the terms "comprising", "including" or any other variation thereof, are intended to cover a non-exclusive inclusion, such that a process, method, article or device that comprises a list of elements not only comprises those elements, but also comprises other elements which are not expressly listed or elements inherent in such process, method, article or device. An element defined by the statement of "comprising . . ." does not, without more constraints, preclude the existence of additional identical elements in the process, method, article, or device that comprises the element.

Those skilled in the art would appreciate that the disclosed embodiments herein can be implemented as electronic hardware, computer software or a combination of both. To clearly illustrate the interchangeability of hardware and software, the composition and steps of each example have been described above generally in terms of their functionality. Whether such functionality is implemented as hardware or software depends upon the particular application and design constraints imposed on the technical scheme. The skilled person in the art may implement the described functionality in varying ways for each particular application, but such implementation should not be interpreted as causing a departure from the scope of the embodiments.

Additionally, embodiments may take the form of a program product embodied in one or more computer readable storage mediums storing machine readable code, computer readable code, and/or program code, referred hereafter as code. The storage devices may be tangible, non-transitory, and/or non-transmission. The storage devices do not embody mere signals, though in a certain embodiments, the storage devices only employ signals for accessing code.

What is claimed is:

1. A wireless charging device, comprising:
a first charging unit configured to charge a first electronic device using a first wireless charging protocol, the first charging unit located on a first plane within the charging device;
a second charging unit configured to charge a second electronic device using a second wireless charging protocol, the second charging unit located on a second plane parallel to the first plane;
a shield arranged between the first and second charging units, the shield located on a third plane parallel to the first and second planes, wherein the first charging unit is located on an opposite side of the shield from the second charging unit, wherein the shield absorbs a magnetic field generated by at least one of the first charging unit and the second charging unit; and
a controller that disables power supply to the first charging unit in response to the second charging unit being positioned above the first charging unit and disables power supply to the second charging unit in response to the first charging unit being positioned above the second charging unit.

2. The wireless charging device of claim 1, wherein the shield comprises a ferrite material.

3. The wireless charging device of claim 1, wherein the first charging unit comprises a first output coil, the second charging unit comprises a second output coil, and first output coil and the second output coil wind around in a same axial direction.

4. The wireless charging device of claim 3, wherein the first output coil, the shield, and the second output coil are arranged in an overlapping manner along the axial direction.

5. The wireless charging device of claim 3, wherein a size of the shield on a plane perpendicular to the axial direction is larger than a size of the first output coil first on the perpendicular plane and larger than a size of the second output coil on the perpendicular plane.

6. The wireless charging device of claim 1, wherein the second wireless charging protocol is different from the first wireless charging protocol.

7. The wireless charging device of claim 1, wherein the first charging protocol is the A4WP protocol and the second charging protocol is the Qi protocol.

8. The wireless charging device of claim 1, wherein a distance between a first output coil of the first charging unit and a housing of the wireless charging device is greater than a preset value along an axial direction of the first output coil.

9. The wireless charging device of claim 1, wherein the device further comprises:
a power supply input interface connected to the first charging unit and the second charging unit, wherein the controller selectively provides power for the first charging unit and the second charging unit via the power supply input interface.

10. The wireless charging device of claim 1, wherein the device further comprises:
a sensor, configured to detect a status of the wireless charging device to generate detection information;
wherein the controller disables power supply to the first charging unit or the second charging unit based on the detection information generated by the sensor.

11. The wireless charging device of claim 10, wherein the device further comprises:
a power supply input interface connected to the first charging unit and the second charging unit, wherein the controller selectively provides power for the first charging unit and the second charging unit via the power supply input interface,
wherein the controller controls the power supply input interface to supply power to the first charging unit in response to the detection information indicating that an output coil of the first charging unit is above output coil of the second charging unit; and
wherein the controller controls the power supply input interface to supply power to the second charging unit in response to the detection information indicating that the output coil of the second charging unit is above the output coil of the first charging unit.

12. The wireless charging device of claim 10, wherein the sensor is composed of an acceleration transducer.

13. The wireless charging device of claim 1, further comprising a housing having a first support member that supports the first electronic device, and a second support member that supports the second electronic device.

14. A program product comprising a non-transitory computer readable storage medium that stores code executable by a processor, the executable code comprising code to perform:
detecting, via a sensor, an arrangement of a first output coil and a second output coil of a wireless charging device, the first output coil being located in a first plane within the wireless charging device and the second output coil being located on a second plane parallel to the first plane;
providing power to the first output coil and disabling power supply to the second output coil in response to the detected arrangement indicating the first output coil is positioned above the second charging coil; and
providing power to the second output coil and disabling power supply to the first output coil in response to the detected arrangement indicating the second charging coil is positioned above the first output coil,
wherein the first output coil charges a first electronic device using a first wireless charging protocol and the second output coil charges a second electronic device using a second wireless charging protocol,
wherein the wireless charging device comprises a shield arranged between the first and second output coils, the shield located on a third plane parallel to the first and second planes, wherein the first output coil is located on an opposite side of the shield from the second output coil, wherein the shield absorbs a magnetic field generated by at least one of the first output coil and the second output coil.

15. The program product of claim 14, wherein detecting, via a sensor, the arrangement of the first output coil and the second output coil comprises receiving detection information from an accelerometer, the detection information indicating whether the first output coil is above the second output coil.

16. The program product of claim 14, wherein providing power to the first output coil and disabling power supply to the second output coil comprises controlling a power supply input interface to supply power to a first charging unit containing the first output coil in response to the first output coil being above the second output coil.

17. The program product of claim 14, wherein providing power to the second output coil and disabling power supply to the first output coil comprises controlling the power supply input interface to supply power to a second charging unit containing the second output coil in response to the second output coil being above the first output coil.

18. A wireless charging device comprising:
a first charging unit that charges a first electronic device using a first wireless charging protocol, the first charging unit located on a first plane within the charging device;
a second charging unit that charges a second electronic device using a second wireless charging protocol, the second charging unit located on a second plane parallel to the first plane;
a controller that controls the first charging unit and the second charging unit to generate a magnetic field based on an arrangement of the first charging unit with respect to the second charging unit, wherein the controller disables power supply to the first charging unit in response to the second charging unit being positioned above the first charging unit and disables power supply to the second charging unit in response to the first charging unit being positioned above the second charging unit; and
a shield arranged between the first and second charging units, the shield located on a third plane parallel to the first and second planes, wherein the first charging unit is located on an opposite side of the shield from the second charging unit, wherein the shield absorbs a magnetic field generated by at least one of the first charging unit and the second charging unit.

19. The wireless charging device of claim 18, wherein the first charging unit comprises a first output coil, the second charging unit comprises a second output coil, and first output coil and the second output coil wind around in a same axial direction, and wherein the first output coil, the shield, and the second output coil are arranged in an overlapping manner along the axial direction.

20. The wireless charging device of claim 19, further comprising:
a power supply input interface connected to the first charging unit and the second charging unit,
wherein the controller controls the power supply input interface to supply power to the first charging unit in response to the first output coil being above the second output coil; and
wherein the controller controls the power supply input interface to supply power to the second charging unit in response to the second output coil being above the first output coil.

* * * * *